US006984090B2

(12) United States Patent
Allen

(10) Patent No.: US 6,984,090 B2
(45) Date of Patent: Jan. 10, 2006

(54) ROOT NUTRIENT DELIVERY SYSTEM

(76) Inventor: David M. Allen, 5474 Wildwood, Howell, MI (US) 48843

( * ) Notice: Subject to any disclaimer, the term of this patent is extended or adjusted under 35 U.S.C. 154(b) by 32 days.

(21) Appl. No.: 10/763,109

(22) Filed: Jan. 22, 2004

(65) Prior Publication Data

US 2005/0163569 A1  Jul. 28, 2005

(51) Int. Cl.
*A01G 25/06* (2006.01)
*A01G 29/00* (2006.01)

(52) U.S. Cl. ......................................... 405/45; 47/48.5

(58) Field of Classification Search ................. 405/39, 405/40, 41, 43, 44, 45, 47, FOR. 43–45; 47/48.5, 79, 21.1, 80, 82
See application file for complete search history.

(56) References Cited

U.S. PATENT DOCUMENTS

| | | | | |
|---|---|---|---|---|
| 73,442 A | * | 1/1868 | Fish | 47/48.5 |
| 271,089 A | * | 1/1883 | Lynch | 405/45 |
| 349,874 A | * | 9/1886 | Buhrer | 47/48.5 |
| 1,194,027 A | * | 8/1916 | Kanst | 47/48.5 |
| 1,217,239 A | * | 2/1917 | Swartz | 47/18 |
| 1,280,486 A | * | 10/1918 | Kanst | 47/48.5 |
| 1,791,873 A | * | 2/1931 | Neiman | 47/48.5 |
| 1,971,390 A | * | 8/1934 | Yahres | 47/48.5 |
| 2,105,800 A | * | 1/1938 | Watkins | 405/44 |
| 2,145,934 A | * | 2/1939 | Kingman | 47/47 |
| 3,159,172 A | * | 12/1964 | Baxter | 137/236.1 |
| 3,319,379 A | * | 5/1967 | Groeber et al. | 47/48.5 |
| 3,452,475 A | * | 7/1969 | Johnson, Sr. | 47/82 |
| 3,755,966 A | * | 9/1973 | Smith | 47/48.5 |
| 3,821,863 A | * | 7/1974 | Chan | 47/48.5 |
| 3,874,596 A | * | 4/1975 | Baxter | 239/542 |
| 3,900,962 A | * | 8/1975 | Chan | 47/48.5 |
| 4,125,963 A | * | 11/1978 | Johnson | 47/21.1 |
| 4,268,994 A | * | 5/1981 | Urai | 47/79 |
| 4,378,032 A | * | 3/1983 | Saggese | 138/175 |
| 4,454,684 A | * | 6/1984 | O'Hare | 47/82 |
| 4,577,997 A | * | 3/1986 | Lehto et al. | 405/43 |
| 4,593,490 A | * | 6/1986 | Bodine | 47/79 |
| 4,676,023 A | * | 6/1987 | Mori | 47/82 |
| 4,704,818 A | * | 11/1987 | Cameron | 47/62 C |
| 4,726,143 A | * | 2/1988 | Steinbeck | 47/48.5 |
| 4,753,394 A | * | 6/1988 | Goodman | 239/542 |
| 4,756,120 A | * | 7/1988 | Arledge | 47/59 R |
| 4,785,575 A | * | 11/1988 | Shioi | 47/1.3 |
| 4,961,284 A | * | 10/1990 | Williams | 47/66.5 |
| 4,986,027 A | * | 1/1991 | Harvey | 47/59 R |

(Continued)

FOREIGN PATENT DOCUMENTS

FR          2253451     *  4/1975

*Primary Examiner*—Michael Safavi
*Assistant Examiner*—Gay Ann Spahn
(74) *Attorney, Agent, or Firm*—Harness, Dickey & Pierce PLC

(57) ABSTRACT

A system for directing water, nutrients and air to the root system of a plant includes an elongated, hollow housing having a wall member that permits water and air to be transmitted therethrough and which defines an internal cavity with an open top and an open bottom. The system may include a plurality of deflectors that are configured to direct water entering into the open top in a direction toward the wall member so that the water may be passed through the wall member. The system may include an upper flange, which may be coupled to the housing proximate the open top, and/or a lower flange, which may be coupled to the housing and extend upwardly and outwardly therefrom.

20 Claims, 3 Drawing Sheets

U.S. PATENT DOCUMENTS

| | | | | |
|---|---|---|---|---|
| 5,103,584 A | * | 4/1992 | Whisenant | 47/79 |
| 5,172,515 A | * | 12/1992 | Lapshansky et al. | 47/48.5 |
| 5,265,376 A | * | 11/1993 | Less | 47/83 |
| 5,276,997 A | * | 1/1994 | Swearengin et al. | 47/82 |
| 5,333,409 A | * | 8/1994 | Mendes | 47/67 |
| 5,533,300 A | * | 7/1996 | Kesler | 47/48.5 |
| 5,542,605 A | * | 8/1996 | Campau | 239/44 |
| 5,615,517 A | * | 4/1997 | Smith | 47/48.5 |
| 5,795,100 A | | 8/1998 | Thomas et al. | |
| 5,901,496 A | * | 5/1999 | Woodruff | 43/124 |
| 5,911,540 A | * | 6/1999 | Adamson | 405/43 |
| 5,924,240 A | * | 7/1999 | Harrison | 47/48.5 |
| 5,975,797 A | * | 11/1999 | Thomas et al. | 405/45 |
| 5,996,279 A | * | 12/1999 | Zayeratabat | 47/48.5 |
| 6,260,319 B1 | * | 7/2001 | Colomban | 52/404.1 |
| 6,408,570 B1 | * | 6/2002 | Shih et al. | 47/79 |
| 6,540,436 B2 | * | 4/2003 | Ogi | 405/45 |

* cited by examiner

ROOT NUTRIENT DELIVERY SYSTEM

The present invention generally relates watering devices and systems for the irrigation, feeding and aeration of the roots of plants such as trees and shrubs.

Compacted soil is widely recognized as a significant threat to urban trees and shrubs as it inhibits the root systems of plants from absorbing oxygen, water and nutrients and consequently weakens the plants so that they become more susceptible to disease and damage from insects. It is also known that while the "tap roots" of a tree may extend several feet below the surface of the soil, the "feeder roots" that are primarily responsible for the absorption of oxygen, water and nutrients are typically found within the first two to eight inches of soil.

Several devices have been developed in an effort to provide the roots of plants with oxygen, water or nutrients to aid in overcoming the effects of soil compaction. I have found, however, that many of these devices do not adequately deliver oxygen, water and nutrients to the first two to eight inches of soil. Specifically, I have found that elements, such as water and/or fertilizer, introduced into such devices largely flow through the device, despite the presence of holes or conduits that are installed into the sides of the devices. Accordingly, much of the water and nutrients are distributed below the feeder roots, rather than to the feeder roots, thus providing limited or no benefit to the plant.

One solution that has been suggested is to fill the interior of the device with a porous material that will absorb water and fertilizer. Such devices, however, significantly restrict the circulation of air within the device and thereby reduce the capacity of the device to deliver oxygen, an element that is essential to healthy root development, to the surrounding.

Another drawback that has been noted concerns the tendency of the known devices to heave out of and/or sink into the ground due to cyclic freezing and thawing. Such movement of the device relative to the soil is undesirable, particularly since substantially all benefits are lost from units that sink below the grade of the soil.

Another drawback concerns the tendency of the known devices to operate in a "hit-and-miss" manner. More specifically, the feeder roots of plants do not grow away from the plant in a uniform manner and do not seem to have the capacity to identify distant areas where oxygen, water and nutrients may be located. While it is therefore difficult to detect where the feeder roots are located in the soil, it is nonetheless highly imperative that a technician installing one of the known devices place the device within existing feeder roots for the plant to realize any benefit.

Yet another drawback concerns over watering, which can be as detrimental to the plant as a deficiency in water. Accordingly, it is desirable that a technician be able to quickly and easily measure subsurface water levels in the soil proximate such plants to determine whether watering may be required.

SUMMARY

In one form, the present teachings provide a system for directing water, nutrients and air to the root system of a plant. The system may include an elongated, hollow housing having a wall member that permits water and air to be transmitted therethrough and which defines an internal cavity with an open top and an open bottom. The system may further include a plurality of deflectors that are configured to direct water entering into the open top in a direction toward the wall member so that the water may be passed through the wall member. The system may also include an upper flange, which may be coupled to the housing proximate the open top, and/or a lower flange, which may be coupled to the housing and extend upwardly and outwardly therefrom.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
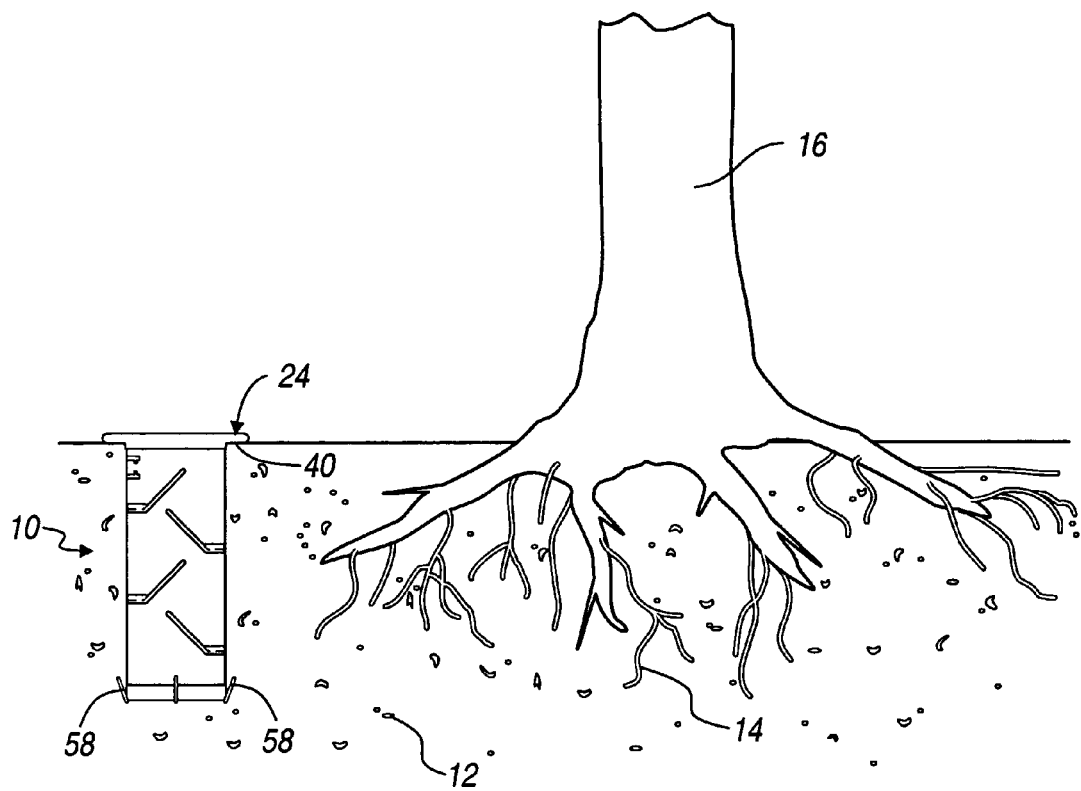
FIG. 1 is a sectional view of a root nutrient delivery system constructed in accordance with the teachings of the present invention, the delivery system being illustrated installed in the soil and operatively associated with the roots of a tree.
Figure 6:
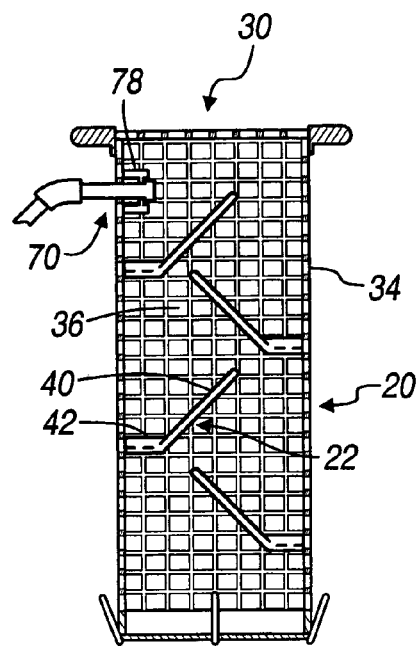
FIG. 6 is a sectional view taken through the delivery system of FIG. 1 and illustrating the delivery system in operative association with a landscape irrigation system.
Figure 8:
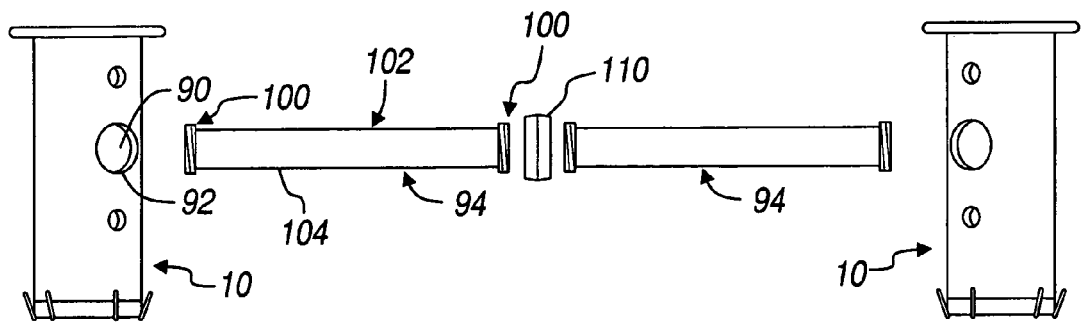
FIG. 8 is an elevation view illustrating the coupling of two delivery systems that have been constructed in accordance with the teachings of the present invention.

With reference to FIG. 1 of the drawings, a root nutrient delivery system constructed in accordance with the teachings of the present invention is generally indicated by reference numeral 10. The delivery system 10 is illustrated to be installed in the soil 12 proximate the feeder roots 14 of an exemplary plant 16. With additional reference to FIG. 2, the delivery system 10 may include a housing 20, a plurality of deflectors 22, an upper flange 24 and a lower flange 26. The housing 20, which may have an open top 30 and an open bottom 32, includes a porous sidewall 34 that defines a central cavity 36 (FIG. 6). The sidewall 34 may be formed with a porosity or mesh that permits oxygen, water and nutrients to flow therethrough but which at least significantly inhibits the migration of soil that surrounds the exterior thereof into the central cavity 36 (FIG. 6).

Figure 4:
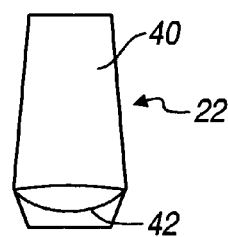
FIG. 4 is an end view of the deflector.
Figure 3:
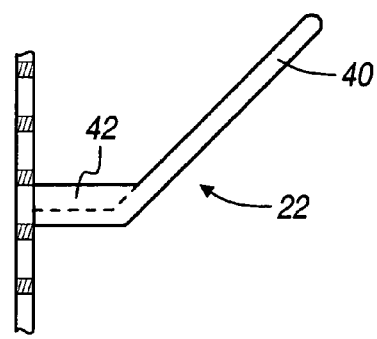
FIG. 3 is a sectional view of a portion of the delivery system of FIG. 1 illustrating the deflector in more detail.

With reference to FIGS. 3, 4 and 6, each of the deflectors 22 is attached to the sidewall 34 and extends therefrom in a direction that is radially inward and upward of the point at which it intersects the sidewall 34. The deflectors 22 may have any desired shape but preferably have shape that permits it to collect and hold water and/or fertilizers that are dispensed through the open top 30 of the housing 20. In the particular example provided, each of the deflectors 22 is generally spoon or ladle shaped, having a generally flat and slanted upper portion 40 and a generally concave reservoir portion 42 that is disposed between the upper portion 40 and the sidewall 34. The deflectors 22 may be vertically staggered within and/or circumferentially spaced about the central cavity 36.

The deflectors 22 may sized so as to partially overlap one or more of the other deflectors 22 so that a liquid dispensed through the open top 30 of the housing 20 must come into contact with at least one of the deflectors 22 to thereby ensure that the liquid is at least partially directed outwardly against the sidewall 34 of the housing 20. As those of ordinary skill in the art will appreciate from this disclosure, liquids contacting a first or uppermost deflector 22 will tend to fill that deflector 22 with the liquid and thereafter, excess liquid will spill over the sides of that deflector 22 so as to be collected by one of the deflectors 22 that are located below the uppermost deflector 22. Accordingly, the deflectors 22 may be employed to direct liquids and nutrients toward the sidewall 34 of the housing 20 at several predetermined depths and radial directions. Configuration of the deflectors 22 in this manner ensures that water and nutrients will be directed into the surrounding soil 12 (FIG. 1) at an appropriate depth (e.g., from two to eight inches) where it will be available for feeder roots 14 (FIG. 1). The configuration of the deflectors 22 further permits each deflector 22 to act as a reservoir that may dispense water to the surrounding soil 12 (FIG. 1).

Returning to FIGS. 1 and 2, the upper flange 24 may be coupled to the housing 20 and may have a lower surface 40 that extends from the sidewall 34 in a direction that is generally perpendicular thereto. The lower surface 40 of the upper flange 24 thus resists forces which would otherwise tend to force the housing 20 downward in the soil 12. Although the upper flange 24 is shown to have a generally flat upper surface 42, it should be appreciated that the upper flange 24 may have any desired shape or configuration. For example, the upper flange 24 may be shaped and/or colored so as to appear as a stone to thereby better camouflage and conceal the presence of the delivery system 10.

An optional cap 50, which may be perforated or formed of a mesh or screen-like material, may be employed to close off the open top 30 of the housing 20 to prevent debris and other objects from falling into the central cavity 36 of the housing 20. The cap 50 may further include an aperture 52 through which a dip stick 54 may be inserted therethrough. The dip stick 54 may be configured to extend downwardly from the cap 50 into the central aperture 36 (FIG. 6) so as to permit a technician to gauge an amount of water that may be contained in the housing 20 upon the removal and inspection of the dip stick 54 from the cap 50. Alternatively, a sensor (not shown) may be coupled to the dip stick 54 (or the housing 20, one of the deflectors 22 or the lower flange 26) to sense the presence or absence of liquid in the housing 20. The sensor may be employed with an automatic watering system (not shown) to selectively activate or deactivate a watering nozzle that may be located in or proximate the delivery system 10.

The lower flange 26 is coupled to the housing 20 at an end opposite the upper flange 24 and may define one or more radially extending protrusions 58 that extend outwardly from the sidewall 34. In the example provided, the radially extending protrusions 58 are upwardly oriented to thereby resist forces that would otherwise lift the housing 20 in the soil.

As it is desirable that field assembly be minimized, one or more of the various components of the delivery system 10 may be co-formed. For example, the housing 20 may be formed of two housing shells (not specifically shown) that may be joined on one side by a living hinge (not shown). The deflectors 22, the upper flange 24 and/or the lower flange 26 may further be integrally formed with the housing shells. Furthermore, one or more tabs (not shown) may be formed on the housing shells, and/or the upper flange 24 and/or the lower flange 26 and may serve as points for securing the components of the delivery system 10 to one another. Those of ordinary skill in the art will appreciate from this disclosure that fasteners (e.g., rivets, screws), adhesives or welds may be employed to couple the tabs to another tab or another component of the delivery system 10. As another example, the upper flange 24 may be independently formed and subsequently coupled (e.g., bonded, welded, riveted, threadably engaged) to the housing shells.

While the delivery system 10 has been illustrated and discussed as a device into which water and/or fertilizer may be manually deposited, those of ordinary skill in the art should appreciate that the invention, in its broader aspects, may be formed somewhat differently. For example, the delivery system 10 may be configured so as to receive water and/or nutrients from a landscape watering system or from another delivery system.

Figure 2:
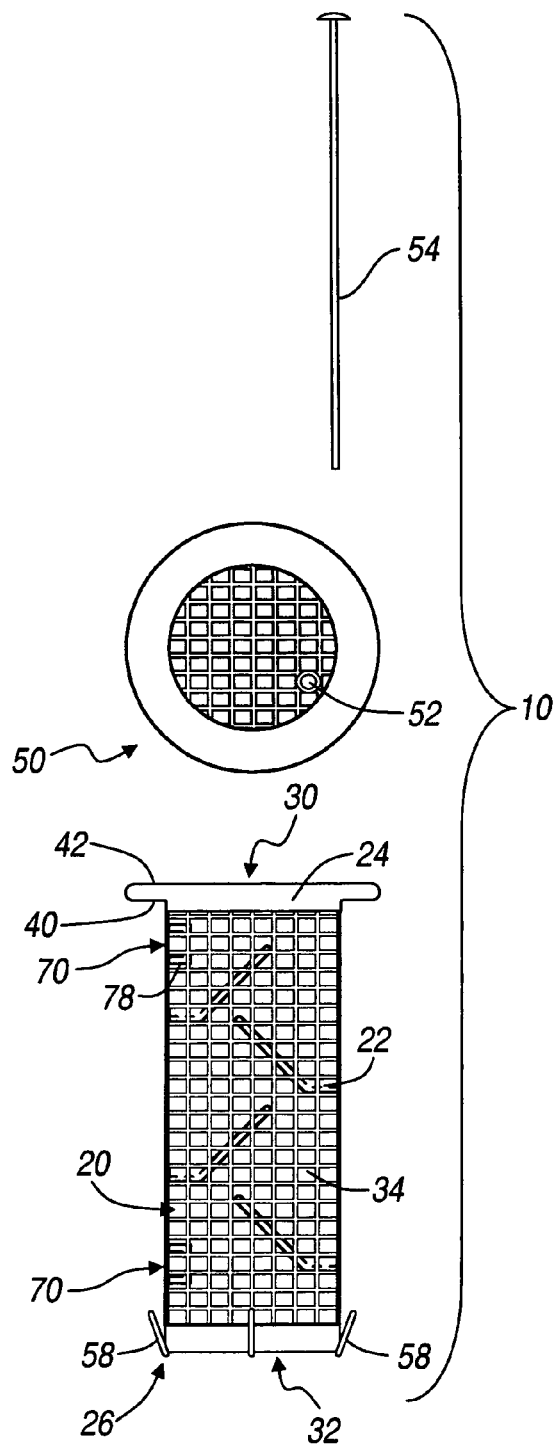
FIG. 2 is an exploded view of the delivery system of FIG. 1.
Figure 5:
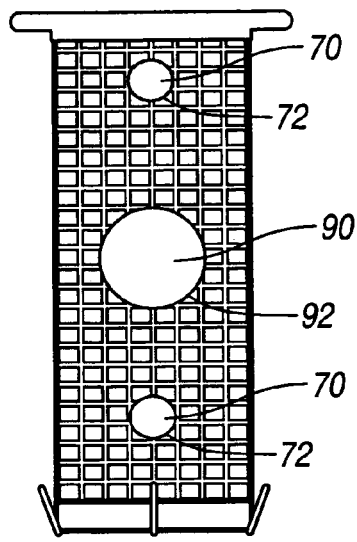
FIG. 5 is an elevation view of a portion of the delivery system of FIG. 1, illustrating the sidewall of the housing in greater detail.

To that end, optional connections may be incorporated into the sidewall 34 to couple the delivery system 10 directly to an irrigation system and/or to one or more other delivery systems 10. With reference to FIGS. 2, 5 and 6, one or more emitter openings 70 may be predefined on the sidewall 34 at desired locations for receiving therethrough an emitter or sprinkler head and an associated water line. As each installation may not employ an emitter, and as it is not desirable to have relatively large open holes in the sidewall 34, the emitter openings 70 may be defined by a series of perforations 72 in the sidewall 34. Consequently, if an emitter is needed, the technician installing the delivery system 10 need only punch out the portion of the sidewall 34 that is located inwardly of the series of perforations 72 to thereby form the emitter opening 70.

Figure 7:
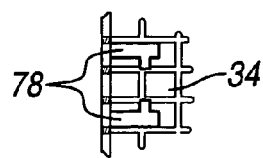
FIG. 7 is a view of an emitter bracket.

To further facilitate the integration of a landscape watering system with the delivery system 10, brackets 78 for retaining an emitter 80 may be coupled to the housing 20 as is illustrated in FIGS. 2, 6 and 7. The brackets 78 may be unitarily formed with the sidewall 34 or may be independently formed and subsequently coupled to the sidewall 34.

As another example, one or more interconnecting apertures 90 may be predefined on the sidewall 34 at desired locations for receiving therethrough a coupling pipe 94 that is employed to connect two or more of the delivery systems 10 in fluid connection with one another. As each installation may not employ multiple, linked delivery systems 10, and as it is not desirable to have relatively large open holes in the sidewall 34, the interconnecting apertures 90 may be defined by a series of perforations 92 in the sidewall 34. Consequently, if the delivery system 10 is to be linked to another, the technician installing the delivery system 10 need only punch out the portion of the sidewall 34 that is located inwardly of the series of perforations 92 to thereby form the interconnecting aperture 90.

Figure 9:
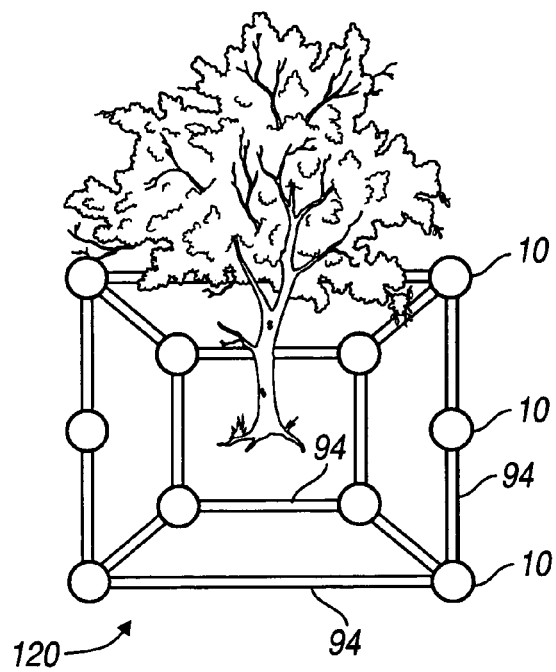
FIG. 9 is a schematic illustration of an interconnected matrix that employs a plurality of the delivery systems that have been constructed in accordance with the teachings of the present invention.

The coupling pipes 94 may be formed with a coupling end 100 that is configured to fit through the interconnecting aperture 90 and engage an inner side of the sidewall 34 (FIG. 6). The coupling pipes 94 may be formed with a highly porous (e.g., heavily perforated) upper surface 102 and a less-porous or non-porous (e.g., less heavily perforated or unperforated) lower surface 104. Construction of the coupling pipes 94 in this manner permits the coupling pipes 94 to collect water and nutrients that have not been absorbed by a given plant and dispense them to an associated delivery system 10 which directs the water and nutrients to the plant so that they may be absorbed. Unions 110 may be provided to interconnect the coupling pipes 94 to one another if the delivery systems 10 are separated by a relatively large distance. Accordingly, a plurality of the delivery systems 10 may be interconnected via the coupling pipes 94 to form a delivery system matrix 120 about a desired plant or series of plants as shown in FIG. 9.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A system for directing water, nutrients and air to a root system of a plant in the ground, the system comprising a delivery unit having:
    an elongated, hollow housing that is adapted to be installed in a generally vertical orientation into the ground proximate the root system, the housing including a wall member that defines an internal cavity with an open top and an open bottom, the wall member being configured to permit water and air to be transmitted therethrough at least at a plurality of discrete points;
    a plurality of deflectors spaced about a perimeter of the internal cavity, the deflectors being configured to capture at least a portion of a quantity of water poured into the open top when the delivery unit is installed in the ground, the deflectors being further configured to direct the captured water outwardly toward the wall member so that it may be passed therethrough;
    an upper flange extending outwardly from the housing proximate the open top; and
    a lower flange coupled to the housing, the lower flange extending outwardly and upwardly from the housing.

2. The system of claim 1, wherein the deflectors include a reservoir portion that is adjacent the wall member, the reservoir portion being configured to hold an amount of water against the wall member.

3. The system of claim 2, wherein each of the deflectors also includes a slated upper portion that directs water into the reservoir portion.

4. The system of claim 1, wherein a plurality of holes are formed into the wall member.

5. The system of claim 1, wherein the wall member is formed of a porous material.

6. The system of claim 1, wherein at least a portion of the deflectors are vertically spaced apart from one another.

7. The system of claim 6, wherein the deflectors are radially spaced apart from one another such that the quantity of water that is poured into the open top must come into contact with at least one of the deflectors.

8. The system of claim 1, further comprising a second one of the delivery units and a fluid conduit that interconnects the delivery unit and the second one of the delivery units.

9. The system of claim 8, wherein the fluid conduit includes a porous upper portion and a lower portion that is less porous than the upper portion.

10. The system of claim 9, wherein the lower portion is impermeable to water.

11. The system of claim 8, wherein the wall member includes a plurality of perforations that cooperate to define an aperture that may be selectively formed in the wall member by punching out a portion of the wall member that is constrained by the perforations, the aperture being sized to receive the fluid conduit therethrough.

12. The system of claim 1, further comprising a cap covering the open top, the cap being configured to permit water and air to be transmitted therethrough.

13. The system of claim 12, further comprising a dip stick extending through the cap into the internal cavity of the housing.

14. The system of claim 1, further comprising a mount that is coupled to the wall member, the mount being adapted to couple a water irrigating device to the housing.

15. The system of claim 14, wherein the wall member includes a plurality of perforations that cooperate to define an aperture that may be selectively formed in the wall member by punching out a portion of the wall member that is constrained by the perforations, the aperture being sized to receive the water irrigating device therethrough.

16. A delivery unit for directing water, nutrients and air to a root system of a plant in the ground, the delivery unit comprising:
    an elongated, hollow housing that is adapted to be installed in a generally vertical orientation into the ground proximate the root system, the housing including a wall member that defines an internal cavity with an open top and an open bottom, the wall member being configured to permit water and air to be transmitted therethrough at least at a plurality of discrete points; and
    a plurality of deflectors spaced about a perimeter of the internal cavity, the deflectors including an upwardly sloped portion that is configured to capture at least a portion of a quantity of water poured into the open top when the delivery unit is installed in the ground and to direct the captured water outwardly toward the wall member so that it may be passed therethrough.

17. The delivery unit of claim 16, wherein the deflectors further include a reservoir that is disposed between an upwardly sloped portion and the wall member.

18. The delivery unit of claim 16, further comprising an upper flange that extends outwardly from the housing proximate the open top.

19. The delivery unit of claim 16, further comprising a lower flange coupled to the housing, the lower flange extending outwardly and upwardly from the housing.

20. The delivery unit of claim 19, wherein the lower flange is located proximate the open bottom of the housing.

* * * * *